June 16, 1964
K. M. ALLEN ETAL 3,137,529
MODULATING FEEDER FOR TRANSFERRING DISCRETE MATERIALS
FROM A PRIMARY CONVEYOR TO A SECONDARY CONVEYOR
Filed Oct. 31, 1961
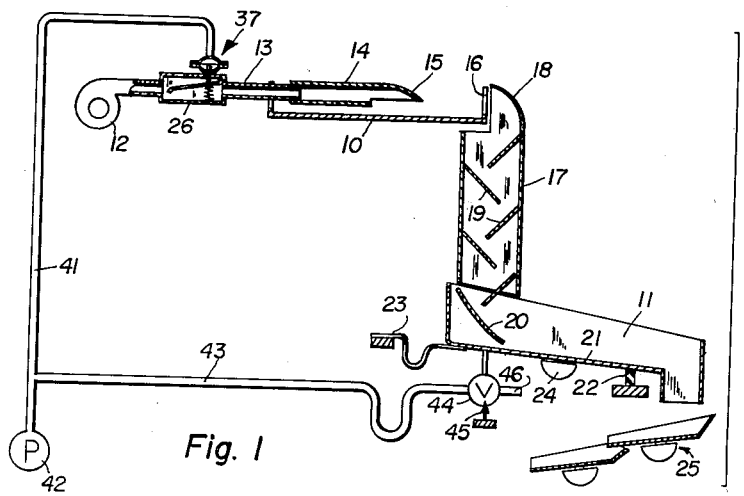
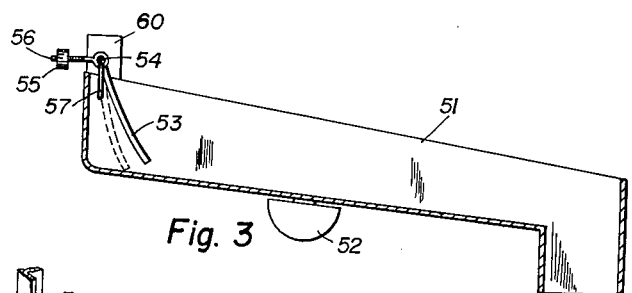
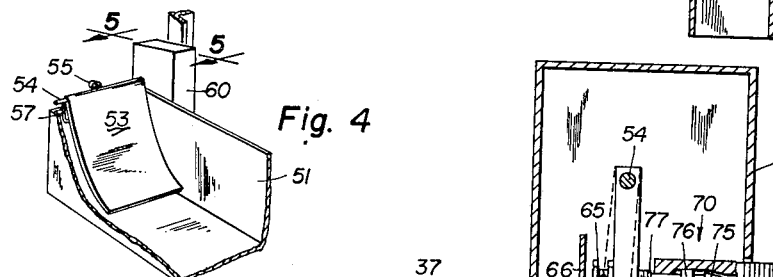
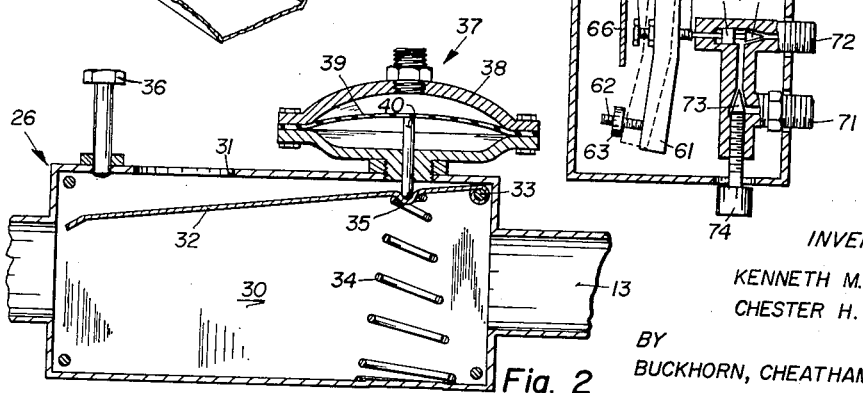
INVENTORS.
KENNETH M. ALLEN
CHESTER H. HARPER
BY
BUCKHORN, CHEATHAM & BLORE
ATTORNEYS

3,137,529
MODULATING FEEDER FOR TRANSFERRING DISCRETE MATERIALS FROM A PRIMARY CONVEYOR TO A SECONDARY CONVEYOR
Kenneth M. Allen and Chester H. Harper, Newberg, Oreg., assignors to Allen-Harper, Inc., Portland, Oreg., a corporation of Oregon
Filed Oct. 31, 1961, Ser. No. 148,998
4 Claims. (Cl. 302—42)

Our invention comprises a modulating feeder for transferring discrete materials from a primary conveyor to a secondary conveyor, the invention comprising means for modulating the action of the feeder in response to the action of the secondary conveyor, lessening the action of the feeder if material accumulates on the secondary conveyor and increasing it if material is arriving too slowly at the secondary conveyor.

The invention is of major utility in the packaging of fragile articles such as potato chips, crackers and cookies, and is also of utility in the packaging of other comestibles such as berries and vegetables, or durable fabricated articles such as small metal parts. The principal purpose of the present invention is to regulate the feeding action of a primary conveyor to a secondary conveyor associated with packaging machinery or other equipment.

The invention comprises an assembly of readily available and easily fabricated parts, deriving its motive power from any convenient source of air under pressure. An advantage of the present invention is that the control of the modulating feeder depends upon regulation of the volume or pressure of air flow without the use of expensive and complicated electrical control means.

Further objects and advantages of the present invention may be more readily ascertained from inspection of the following specification taken in connection with the accompanying drawings wherein like numerals refer to like parts throughout.

In the drawings,

FIG. 1 is a schematic view of the present invention, in a typical operating assembly;

FIG. 2 is an enlarged view of a part of FIG. 1;

FIG. 3 is a view, in cross section, of a modified form of a part of the invention;

FIG. 4 is a partial view, in perspective, of a portion of FIG. 3; and

FIG. 5 is a vertical cross section, on an enlarged scale, taken substantially along line 5—5 of FIG. 4.

Referring to FIGS. 1 and 2, the present invention comprises means for feeding discrete materials from a primary conveyor 10 to a secondary conveyor 11. The primary conveyor 10 may be any suitable type of conveying equipment such as the vibrating conveyor disclosed and claimed in our Patent No. 2,899,044, issued August 11, 1959. A typical installation would comprise an overhead primary conveyor 10 from which materials would be fed, at spaced points, into a plurality of secondary conveyors arranged at a lower level.

The material is blown off of the conveyor 10 by a stream of air supplied from a suitable source such as a blower 12, the outlet thereof comprising a conduit 13 including a telescoping extension 14 terminating in a downwardly facing hood 15 whereby the open end of the conduit directs a stream of air downwardly across the upper surface of the conveyor 10 to blow material through a notch 16 in the side wall of the conveyor. In order to protect fragile articles they are blown into a vertical chute 17 having a hood portion 18 surrounding the notch 16 and providing with a plurality of baffles 19 arranged to cause the material to slide toward alternate sides of the chute and to drop several short distances rather than the entire length of the chute. The materials leaving the chute are dropped onto a curved baffle 20 fixed into the inlet end of the secondary conveyor 11, from which the materials drop onto the upwardly facing feeding surface 21 of the conveyor.

A convenient form of secondary conveyor, representative of any suitable conveyor, is herein illustrated as comprising a vibrating conveyor supported by a resilient support 22 at its forward end and a spring 23 at its inlet end, the supporting means permitting the conveyor to be vibrated by suitable means such as the electromagnetic vibrator 24 schematically indicated herein. The material which flows along the secondary conveyor 11 drops into any desired other equipment, herein schematically exemplified by the modulating, electromagnetically vibrated feeder trays 25 of a weight controlled packaging machine.

The volume and force of air which is ejected from the conduit 13 is controlled by means of a vent valve 26 in the conduit 13. The vent valve conveniently comprises a rectangular box 30 forming an enlargement in the conduit, in the upper wall of which there is provided a vent 31. A valve member comprising a vane 32 is pivotally mounted on a crossrod 33 within the box so as to project toward the inlet to the box, the vane filling the box from side to side but with slight clearance at the edges. The vane is normally projected upwardly by a spring 34 bearing against the bottom wall of the box and held in position by a dimple 35 in the vane. A limiting screw 36 is threaded into the upper part of the box in position to engage the free end of the vane to limit the action of the spring so that the vane can be held at a desired upper extreme position. The limiting screw is made sufficiently long so that the maximum force of the airstream from the open end of the conduit can be set for the particular articles being handled. An air motor 37 comprising a chamber 38 and internal diaphragm 39 is mounted upon the box in such position that a plunger 40 attached to the diaphragm and guided through an opening in the chamber may engage the dimple 35 in the vane 32. The arrangement is such that the diaphragm 39 may be forced downwardly to shift the vane 32 to a lower extreme position such that the flow of air through the conduit is completely blocked and all of the air relieved through the vent 31.

The inlet to the air chamber is connected to a second conduit 41 which leads to a source 42 of air under pressure. A flexible branch 43 of the conduit 41 is connected to a bleed valve 44 fixed to the inlet end of the secondary conveyor 11. If an accumulation of material should occur at the inlet end of the secondary conveyor, the secondary conveyor will be depressed thereby to such an extent that a bleed valve needle 45 fixed to the frame of the equipment will cause bleeding of the air through the bleed opening 46. The extent of depression of the secondary conveyor will determine the extent to which the air pressure is relieved through the valve 44, and hence will determine the extent of depression of the diaphragm 38 and the vane 32. The flow of material from the primary conveyor 10 will be therefore modulated, lessening as material tends to accumulate in the secondary conveyor and increasing when the secondary conveyor is not feeding the proper amount of material to the subsequent equipment.

A modified form of secondary conveyor 51 is illustrated in FIG. 3. This conveyor would be arranged in conjunction with subsequent machinery and would receive material from a primary conveyor in the manner illustrated in FIG. 1. An electromagnetic vibrator 52 may be employed to cause material to move from left to right along the secondary conveyor. In this instance the sensing of accumulations of material in the inlet end of the secondary conveyor is accomplished by a movable sensing member comprising a plate 53 pivoted within the conveyor upon a transverse rod 54 which is suitably mounted for rotation within bearings (not shown) in a fixed portion of the frame so that it is not vibrated by the vibrating mechanism. The member 53 is mounted loosely upon the rod 54 and is counterbalanced in such manner as to tend to swing forward into the path of the material dropping into the secondary conveyor. An adjustable counterweight comprising a weight 55 mounted upon a threaded rod 56 fixed to the member 53 may be provided for this purpose. If an accumulation of material should occur, the weight of the material will tend to swing the member 53 clockwise.

Fixed to the rod 54 is a finger 57 projecting into the path of swinging movement of the member 53 so as to be slightly rocked thereby toward the end of the travel of the member 53, which travel is limited by the member 53 engaging the bottom of the secondary conveyor 51. The rod 54 projects into a valve mounting box 60 suitably mounted on a fixed portion of the frame. Fixed to the rod within the box 60 is an actuating finger 61, lower end of which is bent at an angle to the upper portion thereof for counterweighting effect. A threaded rod 62 carrying an adjustable counterweight member 63 may be attached to the lower end of the finger 61 for adjustment purposes. The finger 61 carries a valve operating screw 65, the head of which engages a fixed limiting member 66 spanning the interior of the box 60 when the finger is swung to the dotted line position shown in FIG. 5.

A valve member 70 mounted within the box 60 is provided with an inlet connection 71 which may be connected to a source of air under pressure corresponding to the source 42 in FIG. 1, and an outlet connection 72 which would lead to the air chamber of the conduit venting air motor 37, corresponding to FIG. 1. Adjacent the inlet connection 71 there is provided a needle valve 73, the stem of which projects through the wall of the box 60, and which is provided with a large head 74 by means of which the pressure of the air admitted to the valve 70 may be regulated. Adjacent the outlet 72 there is provided a floating needle valve 75 provided with a piston flange 76 so arranged that the valve stem head 77 tends to be pushed outward toward the left in FIG. 5. The valve stem head 77 is in alignment with the actuating screw 65. Normally the needle valve 75 will be completely closed since the weight of the finger 61 is designed to completely overcome the force of the air against the piston portion 76. Material dropping against the member 53 may cause it to flutter and become somewhat depressed, but it would be only in the event of an accumulation such that the member 53 engages the finger 57 that the finger 61 will be moved away from the valve head and permit the valve 75 to be variably opened, thereby causing modulating movement of the vane 32 and regulating the flow of material from the primary conveyor in response to the action of the secondary conveyor 51.

Having illustrated and described preferred embodiments of our invention, it should be apparent to those skilled in the art that the invention permits of modification in arrangement and detail. We claim as our invention all such modifications as come within the true spirit and scope of the following claims.

We claim:

1. A modulating feeder for transferring discrete materials from a primary conveyor to a secondary conveyor comprising
   (a) a source of air under pressure,
   (b) a conduit connected to said source and having an open end above and directing a stream of air across said primary conveyor to blow material from said primary conveyor onto said secondary conveyor,
   (c) said conduit having a vent therein,
   (d) a valve member in said conduit adjacent said vent and movable from one extreme position blocking said vent while permitting full flow through said open end of the conduit to a second extreme position blocking the flow of air to said open end of the conduit while permitting full flow through said vent,
   (e) positioning means operatively connected to said valve member,
   (f) and means responsive to accumulations of material in said secondary conveyor for controlling said positioning means to position said valve member at either of said extreme positions or at any position intermediate thereof whereby the flow of material to said secondary conveyor is modulated in response to the action of said secondary conveyor.

2. A modulating feeder for transferring discrete materials from a primary conveyor to a secondary conveyor comprising
   (a) a source of air under pressure,
   (b) a conduit connected to said source and having an open end above and directing a stream of air across said primary conveyor to blow material from said primary conveyor onto said secondary conveyor,
   (c) said conduit having a vent therein,
   (d) a vane pivotally mounted in said conduit adjacent said vent and movable from one extreme position blocking said vent while permitting full flow through said open end of the conduit to a second extreme position blocking the flow of air to said open end of the conduit while permitting full flow through said vent,
   (e) a spring associated with said vanes for moving said vane to one of its extreme positions,
   (f) an air motor opposing said spring for moving said vane to its other extreme position,
   (g) means comprising a second conduit connecting said air motor to a source of air under pressure,
   (h) and means responsive to accumulations of material in said secondary conveyor for variably bleeding air from said second conduit whereby said vane is variably positioned and the flow of material to said secondary conveyor is thereby modulated in response to the flow of material along said secondary conveyor.

3. The construction set forth in claim 2 wherein said means responsive to accumulations of material in said secondary conveyor comprises
   (a) means resiliently supporting said secondary conveyor,
   (b) and a bleed valve responsive to movement of said secondary conveyor in accordance with the weight of material thereon.

4. The construction set forth in claim 2 wherein said means responsive to accumulations of material in said secondary conveyor comprises
   (a) a swinging plate member in said secondary conveyor against which accumulations of material in said secondary conveyor press,
   (b) and a bleed valve operated by said plate member.

References Cited in the file of this patent

UNITED STATES PATENTS

| 2,764,316 | Sylvest | Sept. 25, 1956 |
| 2,861,840 | Powischill | Nov. 25, 1958 |